Nov. 3, 1931.  J. A. LETT  1,830,280
END GATE
Filed Feb. 25, 1930  2 Sheets-Sheet 1
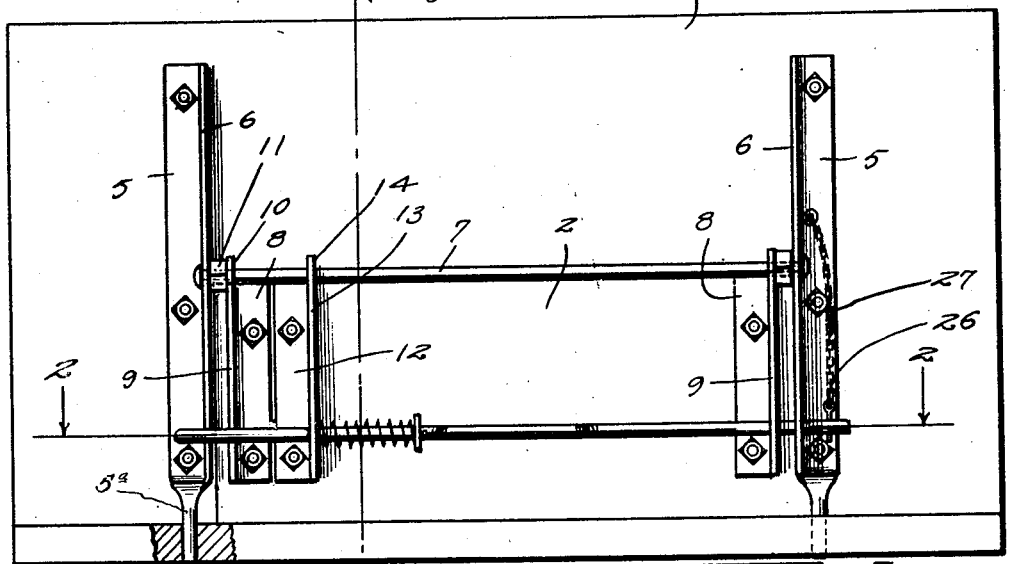
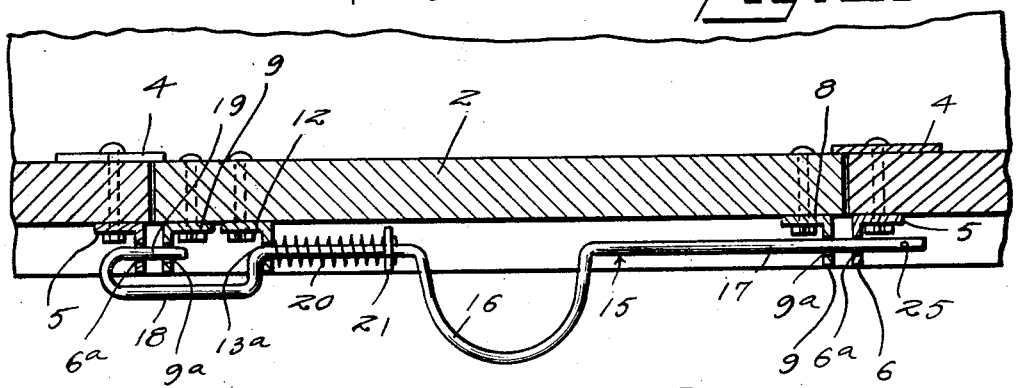
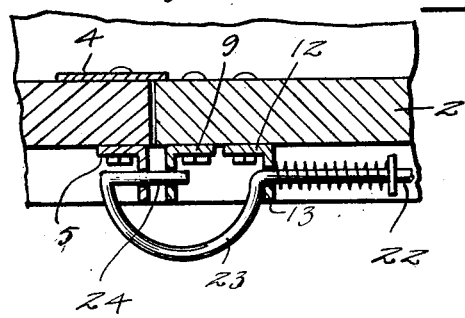
Inventor
J. A. Lett
By Watson E. Coleman
Attorney Nov. 3, 1931.    J. A. LETT    1,830,280
END GATE
Filed Feb. 25, 1930    2 Sheets-Sheet 2
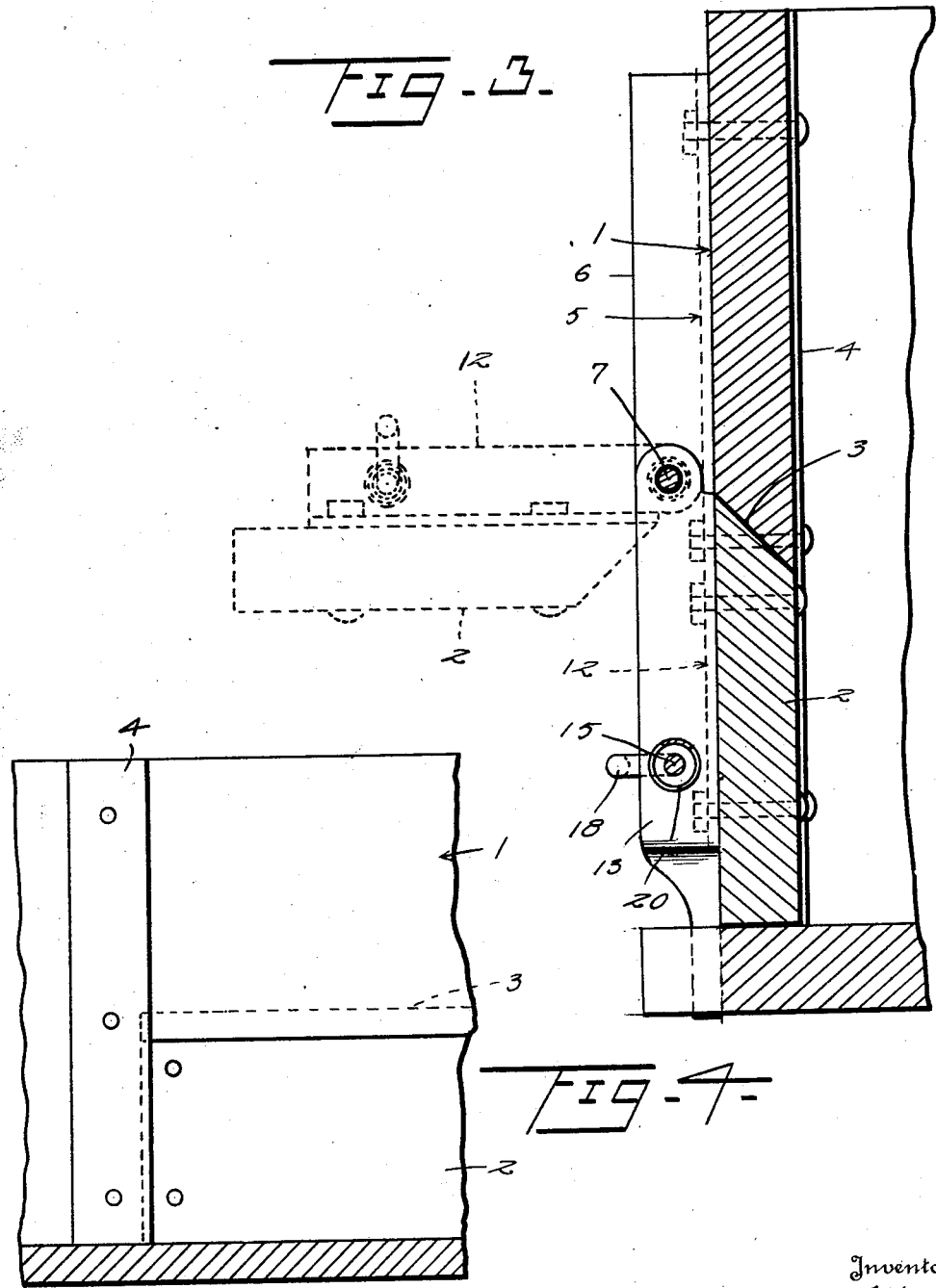
Inventor
J. A. Lett
By Watson E. Coleman
Attorney Patented Nov. 3, 1931

1,830,280

UNITED STATES PATENT OFFICE

JOHN ANDREW LETT, OF YUMA, COLORADO

END-GATE

Application filed February 25, 1930. Serial No. 431,251.

This invention relates to improvements in wagon or truck end gates, the primary object of the invention being to provide an improved means for securing the end gate in closed position.

The invention broadly contemplates the provision of a gate having a removable portion hingedly connected thereto and carrying adjacent each end a flanged element in which is reciprocally mounted a securing bolt, this bolt being reversely bent at one end so that upon shifting it in one direction transversely of the hinged portion of the gate, the ends may be made to enter or move from position in apertures formed through the flanges or members secured to the gate body adjacent the first mentioned flanges.

Another object of the invention is to provide an end gate structure having improved means for securing a removable portion thereof in place, which is of strong and durable construction, easily actuated and positive in action.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in rear elevation of an end gate constructed in accordance with the present invention;

Figure 2 is a sectional view taken upon the line 2—2 of Figure 1;

Figure 3 is a vertical sectional view taken on the line 3—3 of Figure 1;

Figure 4 is a view of a portion of the inner side of the end gate;

Figure 5 is a transverse sectional view of a portion of the gate structure, showing a modified form of latch.

Referring more particularly to the drawings wherein like numerals of reference indicate corresponding parts throughout the several views, the numeral 1 indicates the end gate structure as a whole, the lower portion thereof having cut therefrom a panel 2, the top edge of which is cut obliquely with respect to the faces of the gate, as indicated at 3. This method of cutting the upper edge of the panel and the adjacent edge of the gate body forms a joint between the panel and the gate body which prevents the leakage of grain or other material at this point.

The inner face of the end gate body is provided with a pair of transverse strips 4, a portion of each of which overlies the joint between the adjacent end of the panel 2 and the body of the gate of which it forms a part, as shown in Figure 4.

Upon its outer face the body of the end gate has secured thereto adjacent each end of the panel 2, an angle bar 5, one flange of which, as for example the flange 6, projecting from the face of the gate at right angles thereto. Adjacent the top edge of the panel 2 each of the flanges 6 of the bars 5 is apertured to receive an end of a shaft 7 which extends across the rear face of the end gate along the top of the panel 2, which shaft serves as a support for the panel 2 as will be hereinafter more fully described. The lower end of each of the angle bars 5 is formed to provide a pin 5a which, when the end gate 1 is in position, extends through an aperture formed therefor in the bottom of the vehicle body. This acts to prevent the lower part of the end gate bulging in the event that the pressure exerted against the inner face of the gate should for any reason become excessive.

Adjacent each end of the panel 2 there is secured transversely thereof a short angle bar 8 one flange thereof projecting from the face of the panel the same as the flanges 6 project from the rear face of the gate body 1, these flanges of the bars 8 being indicated by the numeral 9, and each having an extended portion 10 which projects beyond the top edge of the panel 2 and is apertured for the passage therethrough of the shaft 7, suitable spacing nuts 11 surrounding the shaft 7 being interposed between these projecting portions 10 which serve as hinge eyes, and the projecting flanges 6 of the adjacent angle bar 5.

The panel 2 has another angle bar secured to the outer face thereof adjacent one of the first mentioned bars, this angle bar being indicated generally by the numeral 12. As shown, the bar 12, like the bars 8, has one flange extending outwardly from the panel as indicated at 13, which flange at its upper end is extended to form an ear 14 through which the shaft 7 passes.

Adjacent their lower ends the projecting flanges 6, 9 and 13 of the bars described have apertures 6a, 9a and 13a formed therethrough, which apertures are in alinement transversely of the end gate when the panel 2 is in closed position.

A latch bar 15 is provided, which intermediate its ends has an offset portion 16, which serves as a handle by means of which it may be actuated in the manner hereinafter described. One end of the latch bar 15 is straight throughout as indicated at 17, while the other end has a parallel offset portion 18 which terminates in a reversely bent hook 19, the end of which is parallel with the main portion of the bar, as shown in Figure 5.

That portion of the latch bar 15 which lies between the offset 16 and the offset 18 passes through the aperture 13a of the flange 13, while the straight portion 17 is reciprocally mounted in the aperture 9a of the flange remote from the bar 12. It will be seen from inspection of Figure 5 that when the panel 2 is in closed position and the latch bar 15 shifted to the right, the end of the straight portion 17 will pass through the apertured flange of the adjacent bar 5 while the reversely bent end 19 will pass through the aligned apertures 6a and 9a, adjacent thereto. It will thus be seen that the panel 2 may be securely latched in place or unlatched by a single shifting movement of the latch bar 15, the bar being normally urged into latching position by a spring 20 which surrounds the portion lying between the offsets 16 and 18 pressing at one end against the flange 13 and at the other end against the washer 21 which is fixed to the bar.

In Figure 5 a slightly modified form of latching bar is shown. In this form the bar 22 is provided with only one offset portion, this being at one end thereof and of semicircular formation, as indicated at 23, the terminal portion being reversely bent to form the hook 24 which aligns with the main portion of the bar 22, as shown. This offset 23 serves as a means for actuating the latch bar in place of the offset portion 16 of the construction first described.

The straight end 17 of the latch bar 15 is provided with an aperture 25 adjacent the tip thereof which receives a latching pin 26 which is permanently attached to the end gate by a suitable flexible connection, such as a chain 27. This latching pin is passed through the straight end of the latch bar when the same is extended through the flanges of the gate body and the panel so that accidental release of the panel cannot occur.

From the foregoing description it will be readily seen that a removable panel for an end gate equipped with a latch of the character embodying the present invention, may be easily and quickly released or secured in place as described and the mechanism employed is of simple construction and may be strongly and durably and inexpensively manufactured.

It will be readily appreciated from the foregoing that the present device may be used as an end gate for trucks and also for all other practical purposes.

Having thus described my invention, what I claim is:—

1. An improved end gate comprising a body having a panel cut therefrom, angle bars secured to said panel adjacent each end, each having a flange projecting at right angles from the face of the panel and extended at one end beyond the top edge thereof, an angle bar secured to the gate body across each end of the panel and having a flange projecting outwardly therefrom, a shaft extending transversely of the top edge of the panel and passing through the extended ends of the first mentioned bars and through the projecting flanges of the last mentioned bars, a latch bar slidably extended through the projecting flanges of the first mentioned angle bars, one end of the latch bar being straight, the other end of the latch bar having an offset portion terminating in a reversely bent tip arranged substantially in alinement with the main portion of the bar, said tip and the straight end of the latch bar being adapted to pass through apertures formed through the projecting flanges of the adjacent gate body and panel carried angle bars, said panel having the joint between its top edge and the adjacent gate body formed at an oblique angle to the face of the gate to prevent leakage of material therethrough.

2. An improved end gate comprising a body having a panel cut therefrom, angle bars secured to said panel adjacent each end, each having a flange projecting at right angles from the face of the panel and extended at one end beyond the top edge thereof, an angle bar secured to the gate body across each end of the panel and having a flange projecting outwardly therefrom, a shaft extending transversely of the top edge of the panel and passing through the extended ends of the first mentioned bars and through the projecting flanges of the last mentioned bars, a latch bar slidably extended through the projecting flanges of the first mentioned angle bars, one end of the latch bar being straight, the other end of the latch bar having an offset portion terminating in a reversely bent tip arranged substantially in alinement with the main portion of the bar, said tip and the straight end of the latch bar being adapted to pass through apertures formed through the projecting flanges of the adjacent gate body and panel carried angle bars, and a resilient element carried by the latch bar and having engagement at one end with an adjacent angle bar, normally urging the latch bar in one direction transversely of the gate to maintain the ends of the bar in engagement with their respective angle bars.

3. An improved end gate comprising a body having a panel cut therefrom, angle bars secured to said panel adjacent each end, each having a flange projecting at right angles from the face of the panel and extended at one end beyond the top edge thereof, an angle bar secured to the gate body across each end of the panel and having a flange projecting outwardly therefrom, a shaft extending transversely of the top edge of the panel and passing through the extended ends of the first mentioned bars and through the projecting flanges of the last mentioned bars, a latch bar slidably extended through the projecting flanges of the first mentioned angle bars, one end of the latch bar being straight, the other end of the latch bar having an offset portion terminating in a reversely bent tip arranged substantially in alinement with the main portion of the bar, said tip and the straight end of the latch bar being adapted to pass through apertured formed through the projecting flanges of the adjacent gate body and panel carried angle bars, and a latch pin adapted to be passed through an aperture in the latch bar to prevent disconnection of the latch bar from the angle bars on the gate body.

In testimony whereof I hereunto affix my signature.

JOHN ANDREW LETT.